US011446865B2

(12) United States Patent
Streicher et al.

(10) Patent No.: US 11,446,865 B2
(45) Date of Patent: Sep. 20, 2022

(54) PRINT HEAD FOR A 3D PRINTER, WITH IMPROVED CONTROL (71) Applicant: Robert Bosch GmbH, Stuttgart (DE)

(72) Inventors: Markus Streicher, Würzburg (DE); Christian Dueformantel, Esslingen (DE); Hendrik Jahnle, Leutenbach (DE); Norman Lung, Weinstadt (DE); Sebastian Herbster, Magdeburg (DE); Victor Roman, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 500 days.

(21) Appl. No.: 16/349,496

(22) PCT Filed: Sep. 21, 2017

(86) PCT No.: PCT/EP2017/073900
§ 371 (c)(1),
(2) Date: May 13, 2019

(87) PCT Pub. No.: WO2018/086792
PCT Pub. Date: May 17, 2018

(65) Prior Publication Data
US 2020/0189187 A1 Jun. 18, 2020

(30) Foreign Application Priority Data
Nov. 14, 2016 (DE) ...................... 10 2016 222 306.2

(51) Int. Cl.
*B29C 64/20* (2017.01)
*B29C 64/209* (2017.01)
(Continued)

(52) U.S. Cl.
CPC ............ *B29C 64/20* (2017.08); *B29C 64/209* (2017.08); *B29C 64/393* (2017.08);
(Continued)

(58) Field of Classification Search
CPC ..... B29C 64/20; B29C 64/209; B29C 64/393; B29C 64/106; B29C 64/118; B29C 48/797; B33Y 30/00; B33Y 50/02
See application file for complete search history.

(56) References Cited

U.S. PATENT DOCUMENTS 5,121,329 A * 6/1992 Crump ................... B33Y 40/00
700/119
5,238,147 A * 8/1993 Yasui ................... B29C 45/1808
222/1
(Continued)

FOREIGN PATENT DOCUMENTS

CN 103876263 6/2014
CN 103876263 A 6/2014
(Continued)

OTHER PUBLICATIONS

ECourses, Thermodynamics, Sep. 14, 2016, all pages https://web.archive.org/web/20160914173110/http://www.ecourses.ou.edu/cgi-bin/ebook.cgi?topic=th&chap_sec=04.1&page=theory; http://www.ecourses.ou.edu/cgi-bin/ebook.cgi?topic=th&chap_sec=04.1&page=theory (Year: 2016).*
(Continued)

*Primary Examiner* — Jerzi H Moreno Hernandez
(74) *Attorney, Agent, or Firm* — Michael Best & Friedrich LLP (57) ABSTRACT

The invention relates to a print head (10) for a 3D printer (1), comprising a feed zone (11) with a feed (12) for feedstock (20) with variable viscosity, a melting zone (14) comprising a heating element (15) and an outlet opening (16) for the liquid phase (22) of said feedstock (20), as well as a conveyor device (30) for conveying the feedstock (20) from the feed zone (11) into the melting zone (14), said conveyor device (30) comprising a plunger (31) that can be inserted into said feed zone (11).

13 Claims, 4 Drawing Sheets (51) Int. Cl.
*B29C 64/393* (2017.01)
*B33Y 30/00* (2015.01)
*B33Y 50/02* (2015.01)
*B29C 64/118* (2017.01)

(52) U.S. Cl.
CPC ............ *B29C 64/118* (2017.08); *B33Y 30/00* (2014.12); *B33Y 50/02* (2014.12)

(56) References Cited

U.S. PATENT DOCUMENTS

| | | | |
|---|---|---|---|
| 2015/0077215 A1* | 3/2015 | Ranky | H05K 3/1258 338/47 |
| 2016/0082627 A1 | 3/2016 | Kilim et al. | |
| 2016/0200024 A1* | 7/2016 | Kim | G05B 19/188 425/143 |
| 2017/0036399 A1* | 2/2017 | Cheung | B29C 64/393 |
| 2017/0173870 A1* | 6/2017 | Condello | B29C 64/112 |
| 2017/0291364 A1* | 10/2017 | Womer | B29C 48/501 |
| 2018/0027616 A1* | 1/2018 | Rios | B33Y 30/00 219/603 |
| 2019/0232566 A1* | 8/2019 | Bosveld | B33Y 50/02 |
| 2020/0039146 A1* | 2/2020 | Jahnle | B29C 64/106 |
| 2020/0324337 A1* | 10/2020 | Lieberwirth | B29C 48/6803 |
| 2021/0187842 A1* | 6/2021 | Jahnle | B29C 64/209 |

FOREIGN PATENT DOCUMENTS

| | | | | |
|---|---|---|---|---|
| CN | 204505858 U | 7/2015 | | |
| CN | 105690762 A | 6/2016 | | |
| CN | 106079434 A | 11/2016 | | |
| DE | 102013114086 | 6/2015 | | |
| DE | 102013114086 A1 * | 6/2015 | ........... | B29C 64/118 |
| JP | 2015168135 A * | 9/2015 | | |
| JP | 2015168135 A | 9/2015 | | |
| JP | 2016013621 A | 1/2016 | | |
| WO | 2015023077 | 2/2015 | | |
| WO | WO-2015023077 A1 * | 2/2015 | ........... | B29C 64/118 |
| WO | 2015129733 A1 | 9/2015 | | |

OTHER PUBLICATIONS

International Search Report for Application No. PCT/EP2017/073900 dated Dec. 7, 2017 (English Translation, 2 pages).

Tong, "Advanced Materials for Thermal Management of Electronic Packaging", National Defense Industry Press, 2016, (19 pages including cover page).

The State Intellectual Property Office of People's Republic of China Second Office Action for Application No. 201780070599.8 dated Jul. 7, 2021 (12 pages including English translation).

* cited by examiner

PRINT HEAD FOR A 3D PRINTER, WITH IMPROVED CONTROL

BACKGROUND OF THE INVENTION

The present invention relates to a print head for 3D printers for the selective local discharge of the liquid phase of a starting material.

A 3D printer for a material of variable viscosity receives a solid phase of said material as starting material, produces a liquid phase therefrom, and applies said liquid phase selectively at the points which belong to the object to be produced. A 3D printer of this type comprises a print head, in which the starting material is prepared such that it is ready for printing. Furthermore, means are provided for producing a relative movement between the print head and the working surface on which the object is to be produced. Here, either only the print head, only the working surface or else both the print head and the working surface can be moved.

The print head has a first operating state, in which liquid material exits from it, and a second operating state, in which no liquid material exits from it. The second operating state is assumed, for example, when another position on the working surface is to be moved to and no material is to be deposited on the way there. Switching over can be carried out between the two operating states of the print head, for example, by the advancing means of the solid starting material being switched on and off.

"Fused deposition modeling" (FDM) is most common, in the case of which a filament of the starting material is melted in an electrically heated extruder nozzle and is applied in layers to a platform. In the form of a filament of this type, the starting material is very expensive. It is proposed in US 2016/082 627 A1 to feed in the starting material in granulate form and to convey it by way of a conveying worm to a heated zone, from which it exits in plasticized form. Firstly, granulate is considerably less expensive, and secondly mixtures comprising different thermoplastic materials can be produced simply in this way.

SUMMARY OF THE INVENTION

Within the context of the invention, a print head for a 3D printer has been developed. Said print head comprises an infeed zone with a feeding means for a starting material of variable viscosity, a plasticizing zone with a heating means and an outlet opening for the liquid phase of the starting material, and a conveying apparatus for conveying the granulate from the infeed zone into the plasticizing zone.

Here, in particular, a feeding means for a starting material which is present as granulate can be provided. The starting material can be, in particular, a thermoplastic material.

According to the invention, the conveying apparatus comprises a plunger which can be introduced into the infeed zone.

It has been determined that, as a result, respective specific advantages are achieved in comparison with print heads which use filaments comprising thermoplastic material, and also in comparison with print heads with a conveying worm. Said advantages come into effect, in particular, in conjunction with a starting material which is present as granulate.

Apart from the fact that granulate is less expensive by a factor of 5-100 than a filament made from the same material, the quality of the printed object is dependent on whether the diameter of the filament corresponds exactly to the specification. In interaction with the elastic properties of the filament and the advancing force which is exerted on the filament, said diameter determines the pressure at which the liquid phase of the material ultimately exits from the outlet opening of the print head. Furthermore, fluctuations in the diameter can have the consequence that the filament jams in the print head or else the advancing mechanism can no longer grip the filament, with the result that the printing operation comes to a standstill.

Furthermore, the discharge of the starting material from the print head cannot always be prevented immediately when the printing operation at one position is to be interrupted and, after the movement of the print head to another position, is to be started up again. Undesired threads which are called "angel hairs" are sometimes drawn. A cause for this is that stopping of the advancing mechanism for the filament does not necessarily completely relieve the pressure which loads the liquid phase of the starting material and drives the latter out of the outlet opening. The filament has been subjected to a compressive stress by way of the previous advancing operation, with the result that it first of all presses further onto the melt even after the stopping of the advancing operation. In contrast, the plunger which is provided in accordance with the invention can be withdrawn and can thus not only relieve the pressure completely, but rather it can even generate a vacuum in the print head, which vacuum prevents the further discharge of liquid material.

Moreover, the structural design of the conveying apparatus with the plunger simplifies the introduction of additional valves which close the outlet opening in comparison with the previous design with the conveying worm.

Finally, starting materials are freely available in far more variants as granulate than in filament form. The production of the filament is a process which is expensive, damages the quality of the starting material, and is not possible for every material. Ultimately, said process also scarcely provides a benefit, since it is gone as soon as the starting material is melted. It is therefore expedient to omit said process from the outset and to use granulate as starting material.

In comparison with a print head which transports granulate by way of a conveying worm, the print head in accordance with the invention can be of more compact design. This in turn has the consequence that the print head is lighter and can be moved more easily. This is advantageous, in particular, when the print head is to be moved very rapidly, in particular at speeds of 100 mm/s or more.

Furthermore, it has been surprisingly determined that the conveying of the starting material by way of the plunger maintains the quality of the material more satisfactorily than the conveying by way of a conveying worm.

Firstly, the time duration for which the material remains above its melting temperature, can be reduced considerably, with the result that it degenerates thermally to a lesser extent. Excessively high thermal loading produces fission products, primarily gases, which accelerate a further decomposition of the material as a result of the pressures which prevail in the system, and also have a direct influence on the quality of said material. This is manifested, for example, in fluctuations of the extruded volume or else in discoloration, superficial burning or foaming of the extruded material. Furthermore, deposits are formed in the system which detach and clog up the system or pass as loose particles into the object to be produced. Furthermore, material can also be extruded in an undesired manner as a result of the pressure of gaseous fission products. If the outlet opening is closed by a valve, an overpressure can even be built up here and the print head can explode. If the outlet opening is closed by way of solid fission products, a pressure can likewise be built up in the print head, which pressure can be discharged in an explosion-like extrusion of hot material. On account of the residual heat, this can even still occur when the energy supply for heating the print head has already been switched off by way of a safety system.

Secondly, shear forces are also not exerted on the material, which shear forces split up the polymer chains of the material. The longer said polymer chains are, the greater the mechanical strength of the ultimately obtained object with respect, for example, to tensile, compressive and bending loads. The resistance of the object to chemical media is also better the longer the polymer chains are.

Furthermore, volumes that may be as small as desired can be plasticized, whereas a defined minimum quantity of material always has to be plasticized in the case of conveying by way of a conveying worm. A conveying worm requires a minimum quantity of this type in order to build up the propulsive forces which are absolutely necessary for the function of the conveying worm.

When the plunger presses onto the granulate, the latter is compressed and conveyed to the plasticizing zone. Here, the ambient air which is contained in the fill of the granulate has to be discharged. This can take place firstly through the gap with which the plunger is guided in the print head. The dimensions of said gap are not critical. The gap merely has to be narrow enough that no grains of the granulate can penetrate into it and can jam there. Secondly, as an alternative or in combination, one or more venting openings can also be provided at another location.

The fact that the dimensions of the gap are not critical is due to the separation between the infeed zone and the plasticizing zone. The sealing means would be very complex if the plunger dipped directly into the liquid phase of the starting material.

When the plunger is relieved of pressure, to which end backing off by a few tenths of a millimeter is already sufficient, the exit of starting material from the outlet opening is stopped immediately. If the plunger is additionally withdrawn behind the feeding means for the granulate, a space is opened up, into which fresh granulate can trickle from the feeding means. In this way, the exit of material from the outlet opening and the refilling of granulate alternate in a cyclical manner. In contrast to the conveying by way of the conveying worm, it is therefore not possible to allow material to exit continuously from the outlet opening. The inventors have determined that the abovementioned advantages more than compensate for said apparent disadvantage. The interruption of the material exit as a result of the withdrawal of the plunger and the renewed build-up of pressure is so brief that it is not reflected as a flaw or as a strength defect or quality defect in the finished object. Said brief interruption can also be bridged by way of a second print head.

In one particularly advantageous refinement of the invention, means are provided in order to keep the temperature $T_S$ of the infeed zone below the temperature $T_P$, above which the starting material plasticizes, even when the liquid phase of the starting material exits from the outlet opening. This is synonymous with the plunger coming into contact exclusively with the solid phase of the starting material and not with a plasticized phase. The plasticized phase has a viscous, tacky consistency with a high tendency to surface adhesion. If the plunger comes into contact with said phase, it can stick to it, as a result of which, for example, trickling in of fresh granulate during the withdrawal of the plunger is impeded. In order to keep the temperature $T_S$ in the infeed zone below $T_P$, a cooling means of the infeed zone can be provided, in particular. A cooling means of this type is also counterintuitive in comparison with the prior art, in which it comes down to only the heating of the starting material. As an alternative or in combination with an active cooling means, the temperature $T_S$ in the infeed zone can also be controlled, for example, by way of a thermal insulation with respect to the plasticizing zone, and/or by way of the infeed zone being spaced apart from the plasticizing zone.

In one particularly advantageous refinement of the invention, the drive source for the plunger is configured to generate a pressure p of 1000 bar or more, preferably of 1500 bar or more, in the starting material. In this way, the liquid phase of a highly viscous starting material can also be pressed through considerably smaller outlet openings, with the result that the resolution of intricate printed structures can be improved considerably.

As an alternative, the drive source for the plunger is advantageously configured to generate a pressure p of between 350 bar and 750 bar in the starting material. In said pressure range, a sufficiently large class of plastics can be processed as starting materials with a comparatively moderate technical expenditure.

In the case of 3D printing with a filament as starting material, the pressure which drives the liquid material out of the outlet opening of the print head is generated by way of the advancing of the filament. The maximum pressure which can be achieved is therefore comparatively low owing to the principles involved. It lies in the order of magnitude of 60-70 bar. At higher pressures, melted material flows in the reverse direction past the filament and therefore exits from the print head at the incorrect location. Therefore, nozzle diameters and therefore lateral structural resolutions from approximately 0.4 mm can currently be used on a commercial scale. It is currently the subject of research to improve said limits to values of 0.2 mm or less. Some plastics can also not be processed at all or only with uninteresting nozzle diameters, since they are too viscous even in the liquid state for the available pressure. The accuracy of the printed structures lies in the same order of magnitude.

If, in contrast, a considerably higher pressure is available owing to the use of the plunger, nozzle diameters of around 0.1 mm can be used, and structures can be printed precisely down to approximately ±50 µm. Furthermore, all thermoplastic materials and also certain thermosets and elastomers can in principle be used. Low-melting solders, such as tin, or materials with fillers of any type can also be used. Different nozzle diameters are possibly necessary if said materials are used. The print head functions with every nozzle diameter, since the conveying of the starting material by way of the plunger is freely scalable. The scaling is merely to be adapted to the specific material.

The drive source for the plunger can be, for example, an electric motor with a mechanical transmission means, for instance by way of a mechanical spindle. In the case of a transmission means of this type, force and therefore pressure boosting accompany a travel extension, with the result that the pressure build-up lasts for a correspondingly longer time and the print head becomes heavier as a result of the lower force density. As an alternative, the drive source can be a hydraulic pressure source (here, in particular, a servo-hydraulic pressure source). The transmission ratio is brought about here via area ratios of active surfaces.

In a further particularly advantageous refinement of the invention, a travel measuring system for the position s of the plunger and/or a sensor for the force F which is exerted by the plunger on the granulate or for a hydraulic pressure $p_H$ which is exerted on the plunger are/is provided. The advancing of the plunger is a measure of the quantity Q of starting material which exits from the outlet opening. Said quantity can be checked via the travel measuring system. Furthermore, the force F is correlated directly with the pressure in the starting material.

In a further particularly advantageous refinement of the invention, in the print head and/or in the 3D printer which comprises the print head, an active regulation means is provided for the drive source of the plunger, which active regulation means is configured to regulate the force F which is exerted by the plunger on the granulate to a predefined setpoint value $F_S$. As a result, the pressure in the starting material can be kept at a predefined value. In particular, a compensation operation can be carried out automatically in this way when ambient air escapes from the fill of the granulate and said fill is therefore compacted. The advancing of the plunger can be regulated in a distance-dependent and force-dependent manner in the µm range, in particular, by way of a process control operation.

In a further particularly advantageous refinement of the invention, a pressure sensor for the pressure $p_L$ and/or a temperature sensor for the temperature $T_L$ of the liquid phase of the starting material are/is arranged in the region of the outlet opening. The pressure $p_L$ is the primary parameter which is decisive for the mass flow Q of starting material from the outlet opening. An additional measurement of the temperature $T_L$ makes it possible to also take the temperature dependence of the viscosity of the starting material into consideration during the determination of the mass flow Q. The quantity Q to be metered can be regulated exactly by way of the advancing of the plunger. The control of the temperature $T_L$, in particular in the form of a constant and precise regulation, is even more important for the quality of the produced object, in order to avoid a thermal degradation of the starting material. Accordingly, for example, the pressure sensor can be dispensed with in one favorable variant of the print head.

In a further particularly advantageous refinement of the invention, an evaluation unit is provided which is configured to evaluate a volumetric increase ΔV+ of the liquid phase of the starting material when being relieved through the outlet opening from the pressure $p_L$ and/or the temperature $T_L$. The inventors have determined that the precise quantity of material which leaves the outlet opening is not decisive for the accuracy of the structures which are applied to the object to be produced. Rather, the quantity which arrives on the object to be produced is decisive. Since the invention makes it possible to drive the starting material at substantially higher pressures through small outlet openings than has been possible in accordance with the prior art to date, the volumetric increase ΔV+ as a result of the relieving of said high pressures becomes an effect which is relevant for the actually produced structure size. For example, the advancing of the plunger can be decreased by an amount which corresponds to the volumetric increase ΔV+ at the instigation of the evaluation unit. In this way, for example, a strand of starting material which has a diameter of 100 µm±5 µm can be deposited on the object to be produced.

In a further advantageous refinement of the invention, the evaluation unit is additionally configured to evaluate a volumetric decrease ΔV− of the liquid phase of the starting material when solidifying after the exit from the outlet opening from the temperature $T_L$. Thus, for example, a strand of starting material can be deposited on the object, which strand of starting material initially has a diameter of 105 µm and shrinks exactly to the desired diameter of 100 µm when solidifying.

In a further particularly advantageous refinement of the invention, the evaluation unit is additionally configured to evaluate the energy flow E which transports the liquid phase of the starting material, which liquid phase passes through the outlet opening. In this way, the heat balance in the object to be produced can be monitored overall, with the result that further printing strategies and path movements of the print head can be adapted. For example, it can be necessary during the production of an extensive object to interrupt the printing operation at one position and to continue it after the movement of the print head to another position. If the energy flow E is evaluated, it can be seen, for example, that the position at which the printing operation is to be continued has shifted on account of thermal effects and a reaction to this is to be had accordingly. Here, in particular, the energy dissipation from the object as a result of heat conduction and/or heat radiation can also be taken into consideration.

In a further particularly advantageous refinement of the invention, the evaluation unit is additionally configured to evaluate the mass flow Q of the starting material, which mass flow Q passes through the outlet opening, with consideration of the position s of the plunger, and/or from the force F which is exerted by the plunger. In this way, the accuracy of the metering and, in particular, of the structure sizes which are produced on the object, can be improved further.

In order that the variables which are measured by the sensors and are evaluated by the evaluation unit are ultimately reflected in more precise production of structures of the object to be produced, said variables can be fed back, in particular, into an active process control operation.

A set of parameters can possibly be produced by way of a qualification and characterization of materials on the print head, which set of parameters makes it possible to produce structures with high accuracy even in a purely controlled manner, that is to say without active feedback.

The above-described geometries, temperatures and other values can be scaled as desired to different materials or material groups.

BRIEF DESCRIPTION OF THE DRAWINGS

Further measures which improve the invention will be described in greater detail in the following text together with the description of the preferred exemplary embodiments of the invention using figures.

In the figures.

DETAILED DESCRIPTION

Figure 1:
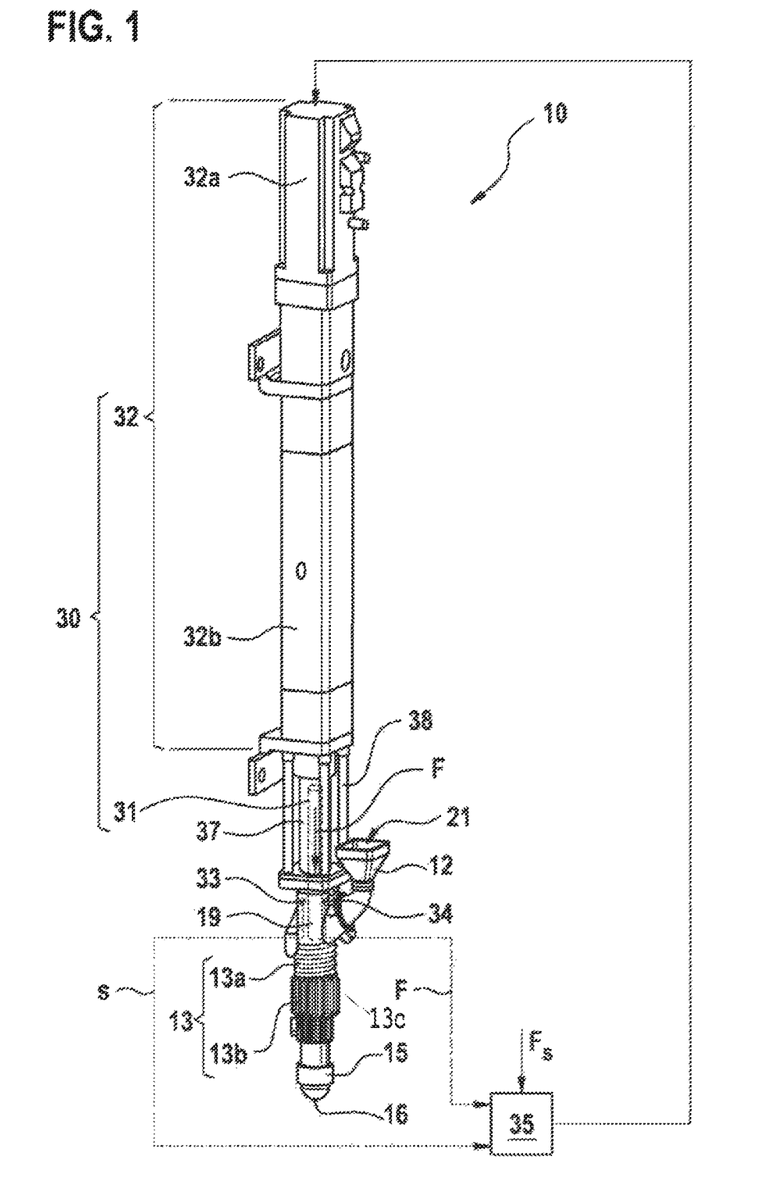
FIG. 1 shows one exemplary embodiment of a print head in accordance with the invention.

FIG. 1 shows one exemplary embodiment of the print head 10 in a perspective view from the outside. The housing 19 of the print head 10, which housing 19 has a funnel-shaped feeding means 12 for the granulate 21 of the starting material 20, merges upward into an intermediate piece 38. Said intermediate piece 38 comprises a cylinder 37, in which the plunger 31 is guided. In the perspective which is selected in FIG. 1, the plunger 31 is concealed by way of the cylinder 37 and is therefore merely indicated. The movement of the plunger 31 is driven via an electric motor 32a, the rotational movement of which is converted via a mechanical spindle 32b into a linear movement. The plunger 31 and the drive source 32 together form the conveying apparatus 30 for conveying the granulate 21.

The travel s of the plunger 31 is measured by way of a travel measuring system 33. The force F, with which the plunger 31 presses on the granulate 21, is measured by way of a force sensor 34. The force F and the travel s are fed to an active regulation means 35 which, furthermore, receives a setpoint value $F_S$ for the force F as an input and actuates the electric motor 32a in such a way that the actual force F is kept in line with the setpoint value $F_S$. Here, the measurement of the travel s ensures the adherence to the boundary condition that the plunger 31 is to come into contact only with the completely solid granulate 21 of the starting material 20, but not with an at least partially plasticized phase which clogs the plunger 31.

In the upper region which faces the feeding means 12, the housing 19 is formed by way of cooling means 13 which comprise an active cooling system 13a with a cooling medium and a passive cooling system 13b with cooling fins 13c. In the lower region which faces the outlet opening 16, in contrast, the housing 19 is surrounded on its outer circumference by a heating strip 15 which provides the heating energy for the plasticization of the starting material 20.

Figure 2:
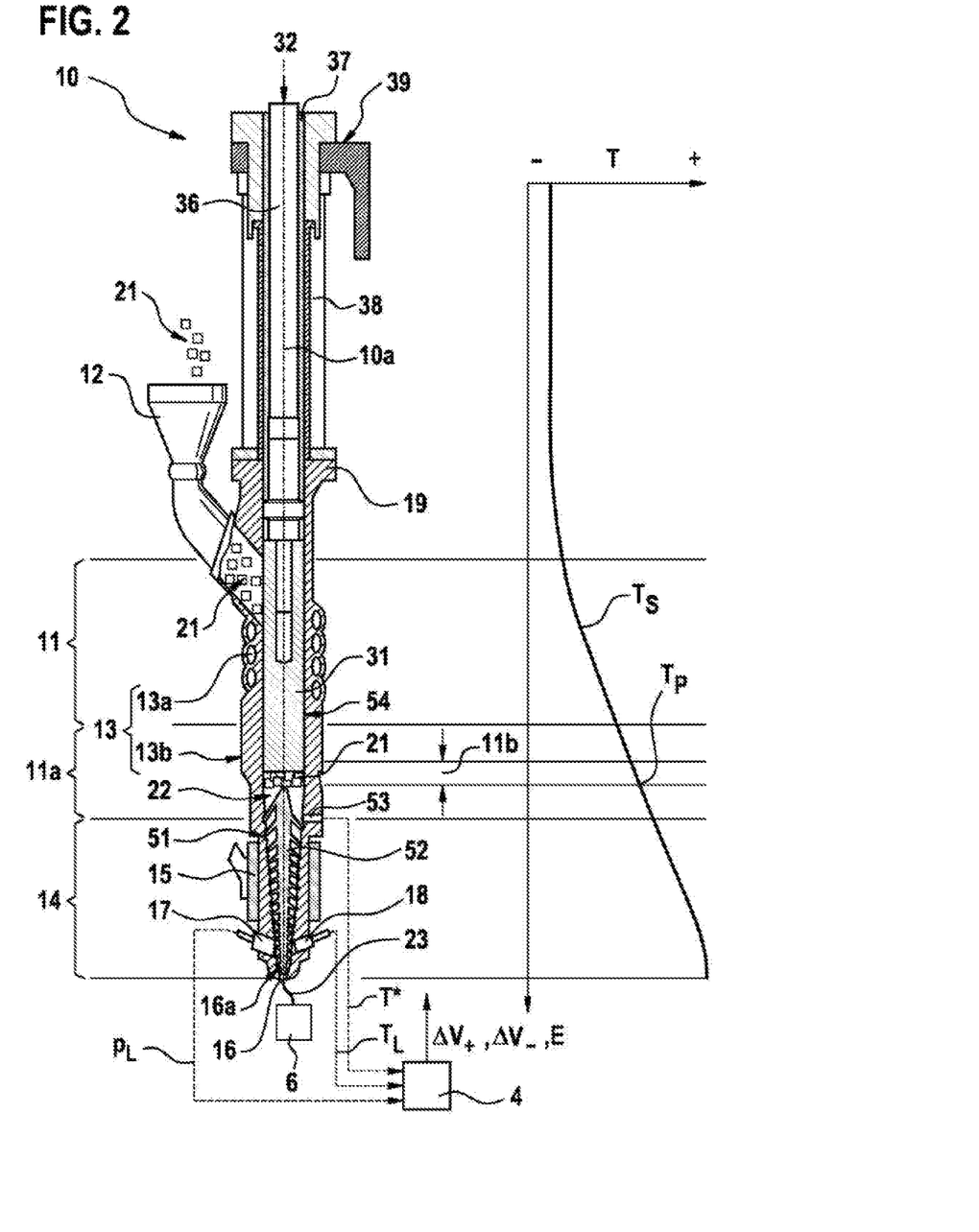
FIG. 2 shows a sectional drawing of the print head in the printing state.

FIG. 2 shows the interior of the print head 10 in that part of the work cycle in which printing is carried out. An infeed zone 11 is situated in the housing 19 of the print head 10, into which infeed zone 11 the granulate 21 of the starting material 20 can be fed via the funnel-shaped feeding means 12. The plunger 31 conveys the granulate 21 out of the infeed zone 11 into the plasticizing zone 14 (also called the metering zone because the measuring of the material 20 into portions takes place there). The infeed zone 11 adjoins the plasticizing zone 14 via a compression zone 11a. Within the compression zone 11a, the boundary layer 11b is situated between greatly compressed but still solid and not tacky granulate 21 on one side and material 20 on the other side, the liquefaction of which has begun. In the position which is shown in FIG. 2, the front end of the plunger 31 is situated exactly in said boundary layer 11b.

The interior space of the housing 19 is configured in the upper region of the housing 19 as far as and including the boundary layer 11b as a straight circular cylinder, in which the plunger 31 can be guided. Further below, the interior space merges into a melting geometry 51. Said melting geometry 51 is distinguished firstly by the fact that its internal cross section tapers more and more in the downward direction, with the result that the pressure of the liquid phase 22 is increased more and more. Secondly, the inner wall of the melting geometry 51 has a structuring which brings about thorough mixing of the liquid phase 22 of the starting material 20. Said structuring can be, for example, fin-shaped, as illustrated by way of example in FIG. 2. The heating strip 15 is arranged on the outer circumference of the housing 19 in the plasticizing zone 14, the heat output of which heating strip 15 is distributed homogeneously over the liquid phase 22 by way of a heat conducting structure 52 (heat conducting torpedo) which is arranged in the interior space of the housing 19, that is to say within the liquid phase 22. Instead of the heating strip 15 which is illustrated by way of example in FIGS. 1 and 2, any other type of heater is also possible. In the front region 16a of the plasticizing zone 14, which front region 16a lies closest to the outlet opening 16, the pressure $p_L$ of the liquid phase 22 is measured by way of a pressure sensor 17, and the temperature $T_L$ of the liquid phase 22 is measured by way of a temperature sensor 18. The region 16a is only a few cubic millimeters in size, with the result that no excess material 20 is melted. The heat conducting structure 52 ensures that the liquid phase 22 of the material 20 always has the greatest possible viscosity in the region 26a, without overheating.

The measured values for $p_L$ and $T_L$ are forwarded to an evaluation unit 4 which additionally receives the measured temperature value T* of a further temperature sensor 53 which is arranged directly at the upper boundary of the plasticizing zone 14 as an input.

A strand 23 is driven from the liquid phase 22 of the starting material 20 by way of the pressure $p_L$ which is generated by the plunger 31 through the outlet opening 16 of the print head 10, and is deposited on the object 6 to be produced. The evaluation unit 4 calculates the quantity ΔV+ by which the volume of the strand 23 firstly increases as a result of the relief from the high pressure $p_L$, and the quantity ΔV− by which said volume secondly decreases as a result of the cooling from the high temperature $T_L$. At the same time, the energy flow E into the object 6 by way of the deposited material 23 is also calculated.

The plunger 31 is guided in the housing 19 with a small venting gap 54. The ambient air which is contained in the fill of the granulate 21 and is released during the compression of said fill can be discharged by way of said gap 54. Gases which are produced during the plasticizing and/or partial decomposition of the starting material 20 can also be discharged along the same path.

As has already been indicated in FIG. 1, the housing 19 is cooled between the boundary layer 11b and the feeding means 12 by way of cooling means 13 which are formed from the active cooling system 13a with a flowing cooling medium and from the passive cooling system 13b by means of cooling fins 13c. As a result, the temperature TS within the infeed zone 11 which rises continuously from the top to the bottom is kept constantly below the temperature TP, above which the starting material 20 plasticizes. TP is reached precisely at the lower end of the boundary layer 11b. Premature melting of the granulate 21, clogging of the infeed zone 11 and water ingress as a result of condensation are avoided by the infeed zone 11 being temperature controlled permanently to a suitable temperature. Said temperature control also regulates the precise position of the boundary layer 11b and can hold the latter, in particular, in a constant position.

The plunger 31 is driven by the drive source 32 via the plunger rod 36 which is guided in a cylinder 37 within the intermediate piece 38 which is in turn held in a holding device 39.

The temperature profile along the longitudinal axis 10a of the print head 10 from cold (−) to warm (+) is illustrated qualitatively on the right next to the print head 10.

Figure 3:
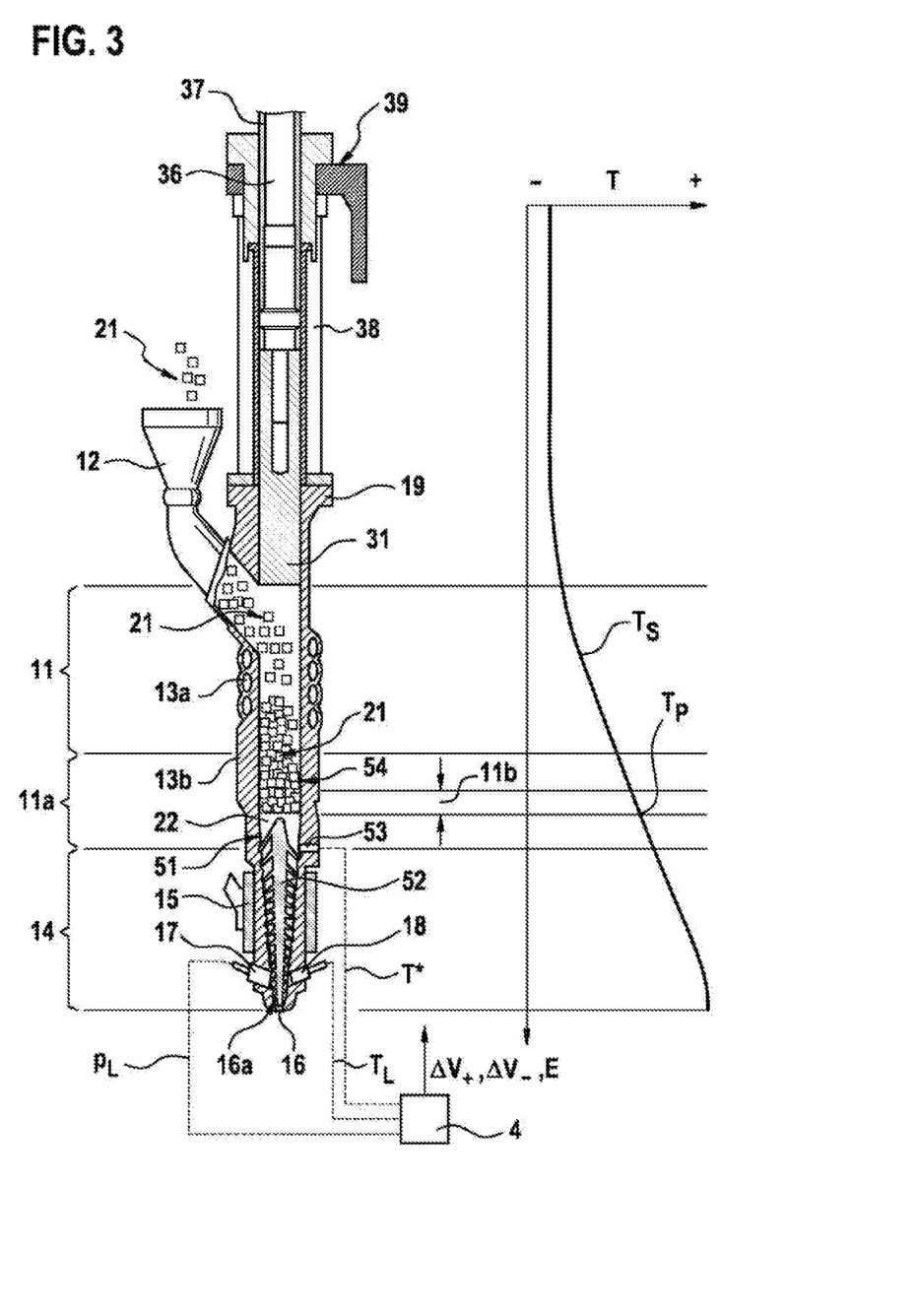
FIG. 3 shows a sectional drawing of the print head in the non-printing state.

FIG. 3 shows the same print head 10 in the same view as in FIG. 2 with the difference that the plunger 31 has been withdrawn upward behind the infeed zone 11 here. This has the effect firstly that no strand 23 of starting material 20 exits from the outlet opening 16 in the state which is shown in FIG. 3. Secondly, the infeed zone 11 is free for fresh granulate 21 to trickle in. When the plunger 31 is lowered again, the fresh granulate 21 (as shown in FIG. 2) is compressed and is plasticized in the plasticizing zone 14 before it exits from the outlet opening 16 as a strand 23.

Figure 4:
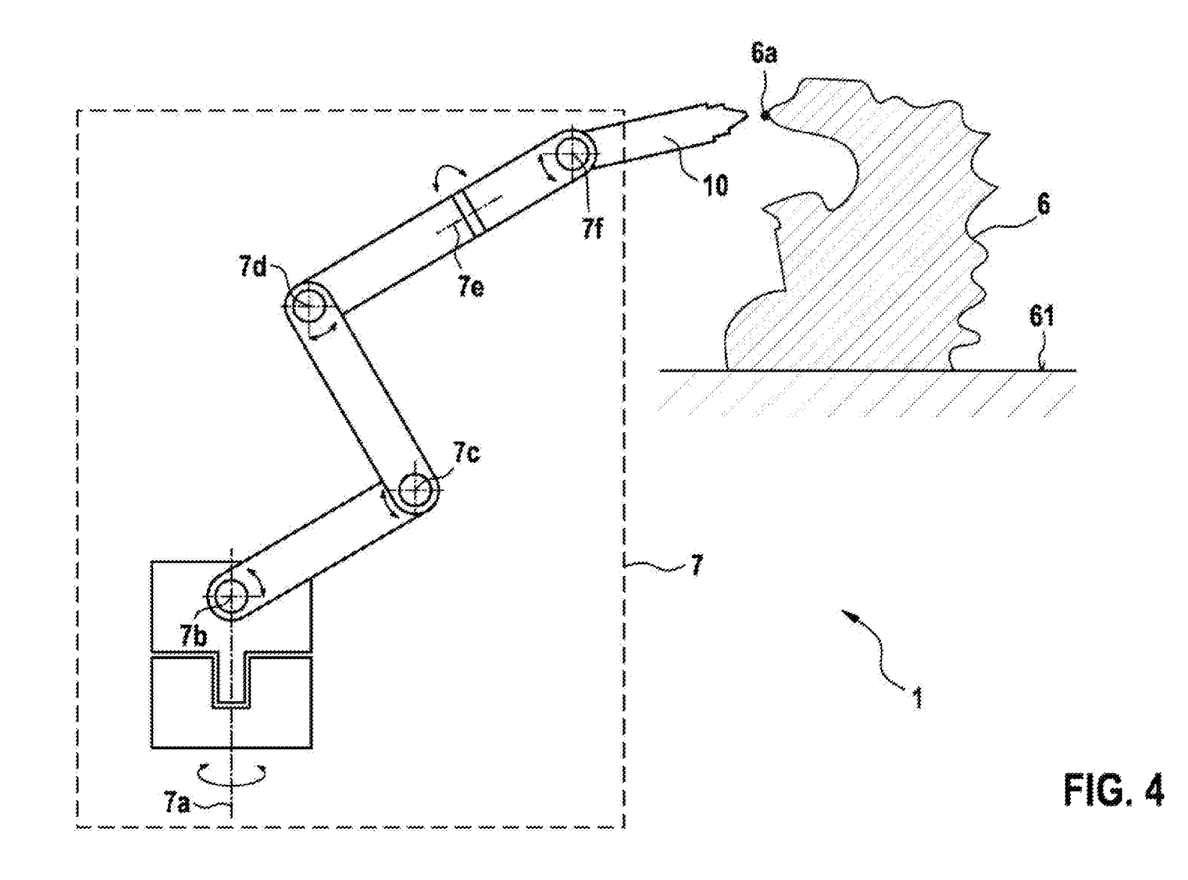
FIG. 4 shows one exemplary embodiment for a 3D printer with the print head.

The print head 10 can be integrated into any desired 3D printers 1. FIG. 4 shows an exemplary 3D printer 1 which comprises the print head 10. The print head 10 is moved by an industrial robot 7 which can be moved about six axes 7a-7f in the directions which are shown respectively by way of arrows. The object 6 is to be constructed on a surface 61.

By way of the industrial robot 7, the print head 10 is given not only a great action radius, but rather is also capable, in particular, of accumulating the starting material 20 in its liquid phase 22 on the object 6 to be produced from any desired angles. If, in the example which is shown in FIG. 3, additional material is to be accumulated on the object 102, for instance, at the point 102a which is illustrated by way of example, the application from the angle which is shown in FIG. 3 is more advantageous than the application perpendicularly from above, since the point 6a is situated on a projection.

In this context, the conveying of the starting material 20 as a granulate 21 by means of the plunger 31 is in turn more advantageous than the advancing as a solid filament which is practiced in the case of most conventional 3D printers. In particular, the build-up of pressure in the print head 10 is more independent of the position, and a fill comprising granulate 21 can be handled more simply than a filament which is to be unrolled.

The invention claimed is:

1. A print head (10) for a 3D printer (1), the print head comprising an infeed zone (11) with a feeding means (12) configured for feeding a starting material (20), a plasticizing zone (14) with a heater (15) and an outlet opening (16) for a liquid phase (22) of the starting material (20), and a conveying apparatus (30) for conveying the starting material (20) from the infeed zone (11) into the plasticizing zone (14), characterized in that the conveying apparatus (30) comprises a plunger (31) configured to be introduced into the infeed zone (11), and wherein the print head (10) further comprises a housing (19) including a cooling means (13) for keeping a temperature ($T_s$) of the infeed zone (11) below a temperature ($T_P$) even when the liquid phase (22) of the starting material (20) exits from the outlet opening (16), wherein the cooling means (13) includes:
an active cooling unit (13a) formed by internal cooling channels surrounding a first portion of the infeed zone (11) and having a flowing cooling medium; and
a passive cooling unit (13b) surrounding a second portion of the infeed zone (11) and formed by cooling fins extending into ambient air surrounding the infeed zone (11), the cooling fins being configured to transfer heat into the ambient air,
wherein the temperature ($T_P$) is a temperature at which the starting material (20) plasticizes,
wherein the active cooling unit (13a) and the passive cooling unit (13b) are arranged downstream from where the starting material (20) is introduced into the infeed zone (11), and
wherein the active cooling unit (13a) is arranged upstream from the passive cooling unit (13b) along a flow direction of the starting material (20).

2. The print head (10) as claimed in claim 1, characterized in that the starting material (20) is present as a granulate (21).

3. The print head (10) as claimed in claim 1, characterized in that a drive source (32) configured for driving the plunger (31) is configured to generate a pressure (p) of 1000 bar or more in the starting material (20).

4. The print head (10) as claimed in claim 1, characterized in that a drive source (32) configured for driving the plunger (31) is configured to generate a pressure (p) of between 350 bar and 750 bar in the starting material (20).

5. The print head (10) as claimed in claim 1, characterized in that a drive source (32) configured for driving the plunger (31) is an electric motor (32a) with a mechanical transmission means (32b) or a hydraulic pressure source (32c).

6. The print head (10) as claimed in claim 2, further comprising an active regulation means (35) configured for regulating a drive source (32) of the plunger (31), which active regulation means (35) is configured to regulate a force (F) which is exerted by the plunger (31) on the granulate (21) to a predefined setpoint value ($F_S$).

7. The print head (10) as claimed in claim 2, characterized in that a pressure sensor (17) configured for determining a pressure ($p_L$) of the liquid phase (22) of the starting material (20) is arranged in a region (16a) of the outlet opening (16).

8. The print head (10) as claimed in claim 1, characterized in that a drive source (32) configured for driving the plunger (31) is configured to generate a pressure (p) of 1500 bar or more in the starting material (20).

9. The print head (10) as claimed in claim 2, further comprising a sensor (34) configured for determining a force (F) which is exerted by the plunger (31) on the granulate (21) or a hydraulic pressure ($p_H$) which is exerted on the plunger (31).

10. The print head (10) as claimed in claim 2, characterized in that a temperature sensor (18) configured for determining a temperature ($T_L$) of the liquid phase (22) of the starting material (20) is arranged in a front region (16a) of the outlet opening (16).

11. A 3D printer (1) having a print head (10) as claimed in claim 2, further comprising an active regulation means (35) configured for regulating a drive source (32) of the plunger (31), which active regulation means (35) is configured to regulate a force (F) which is exerted by the plunger (31) on the granulate (21) to a predefined setpoint value ($F_S$).

12. The print head (10) as claimed in claim 1, wherein the housing (19) defines a flowpath for flowing the starting material (20) through the infeed zone (11) from a point upstream of the active cooling unit (13a) to a point downstream of the passive cooling unit (13b), and wherein the flowpath has a constant diameter.

13. The print head (10) as claimed in claim 1, wherein the infeed zone (11) adjoins the plasticizing zone (14) via a compression zone (11a), wherein an interior space of the infeed zone (11) and at least part of the compression zone (11a) is a straight circular cylinder in which the plunger (31) is guided, and wherein the straight circular cylinder merges into a melting geometry defined by an internal cross section that tapers toward the outlet opening (16).

* * * * *